(12) United States Patent
Barth et al.

(10) Patent No.: US 6,747,420 B2
(45) Date of Patent: Jun. 8, 2004

(54) DRIVE CIRCUIT FOR LIGHT-EMITTING DIODES

(75) Inventors: Alexander Barth, Dornbirn (AT); Peter Hein, Fraxern (AT); Werner Ludorf, Bergen (DE)

(73) Assignee: TridonicAtco GmbH & Co. KG, Dornbirn (AT)

( * ) Notice: Subject to any disclaimer, the term of this patent is extended or adjusted under 35 U.S.C. 154(b) by 43 days.

(21) Appl. No.: 10/242,704

(22) Filed: Sep. 13, 2002

(65) Prior Publication Data

US 2003/0117087 A1 Jun. 26, 2003

Related U.S. Application Data

(63) Continuation of application No. PCT/EP01/02946, filed on Mar. 15, 2001.

(30) Foreign Application Priority Data

Mar. 17, 2000 (DE) .......................................... 100 13 215

(51) Int. Cl.⁷ .............................................. H05B 37/02
(52) U.S. Cl. ....................... 315/291; 315/224; 315/307; 315/169.3
(58) Field of Search ................................. 315/291, 224, 315/307, 308, 169.3, 301, 129, 151, 158, 159

(56) References Cited

U.S. PATENT DOCUMENTS

| | | | | |
|---|---|---|---|---|
| 4,504,776 A | * | 3/1985 | Haville ........................ 323/288 |
| 5,604,673 A | | 2/1997 | Washburn et al. ........... 363/147 |
| 5,661,645 A | * | 8/1997 | Hochstein ...................... 363/89 |
| 5,742,133 A | * | 4/1998 | Wilhelm et al. ............. 315/291 |
| 6,016,038 A | | 1/2000 | Mueller et al. .............. 315/291 |
| 6,057,651 A | | 5/2000 | Usami .......................... 315/291 |
| 6,078,148 A | * | 6/2000 | Hochstein .................... 315/291 |
| 6,161,910 A | * | 12/2000 | Reisenauer et al. ......... 315/309 |
| 6,362,578 B1 | * | 3/2002 | Swanson et al. ............. 315/307 |

FOREIGN PATENT DOCUMENTS

| | | |
|---|---|---|
| EP | 0581206 A2 | 2/1994 |
| GB | 2333593 A | 7/1999 |
| WO | WO 98/49872 | 11/1998 |
| WO | WO 01/05193 | 1/2001 |

OTHER PUBLICATIONS

Driver for Supplying a Pulsating Current to Light Emitting Diodes, R search Disclosure, GB, Industrial Opportunities Ltd. Havant, No. 378, Oct. 1, 1995, p. 651 XP000549126, ISSN 0374–4353.

* cited by examiner

*Primary Examiner*—Don Wong
*Assistant Examiner*—Ephrem Alemu
(74) *Attorney, Agent, or Firm*—Fitzpatrick, Cella, Harper & Scinto

(57) ABSTRACT

The invention relates to a control circuit for at least one light-emitting diode (1) for adjusting the current and/or the voltage of the light-emitting diode (1) to a desired value adjusted by means of a controller (3), the current, the voltage and/or the luminescence of the light-emitting diode (1) being detectable and comparable with the desired value.

22 Claims, 6 Drawing Sheets

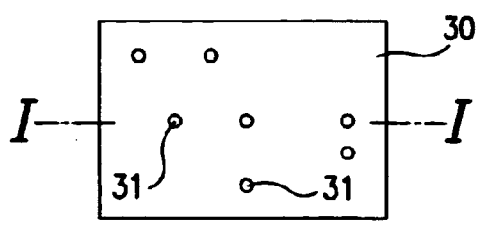
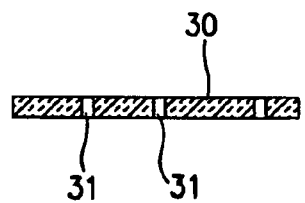
FIG. 10a  FIG. 10b
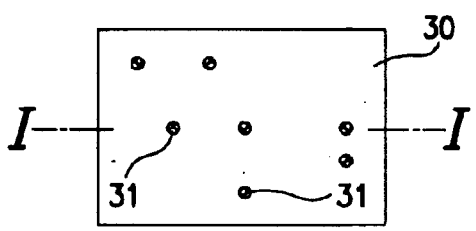
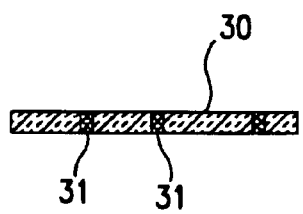
FIG. 11a  FIG. 11b
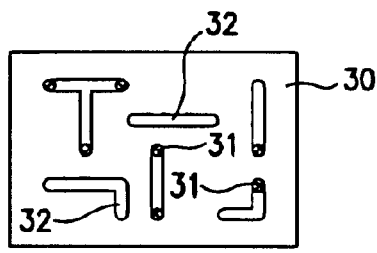
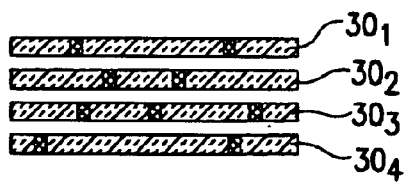
FIG. 12  FIG. 13
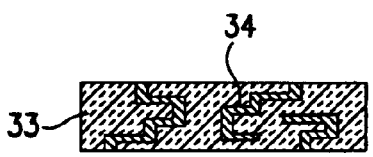
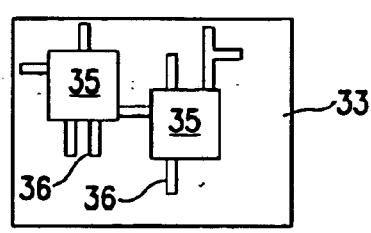
FIG. 14  FIG. 15

DRIVE CIRCUIT FOR LIGHT-EMITTING DIODES

CROSS REFERENCE TO RELATED APPLICATIONS

This is a Continuation of International Application PCT/EP01/02946 filed Mar. 15, 2001 which in turn claims priority of German application DE 100 13 215.4, filed Mar. 17, 2000, the priorities of which are hereby claimed, said International Application having been published in German, but not in English, as WO 01/69980 A1 on Sep. 20, 2001.

BACKGROUND OF THE INVENTION

1. Field of the Invention

The present invention relates to a drive circuit for at least one light-emitting diode by means of which the brightness of the light-emitting diodes (LEDs for short) is regulable to a setpoint value.

2. Description of the Related Art

Various such drive circuits are known from the prior art. Thus, for example, U.S. Pat. No. 6,016,038 discloses a system for driving LED arrangements for illumination purposes. As shown, in particular, in FIGS. 1 and 2 of the U.S. Patent, the individual LEDs or LED groups are driven by a constantly regulated maximum current flowing through the LEDs. The constant maximum current is regulated by means of integrated circuits. The maximum current regulated in this way is switched on and off by means of a current sync, wherein the current sync can be driven in accordance with the desired ratio of the off times and on times of the current. The brightness generated for the observer of the LEDs or LED groups can thus be determined, as is known, by the ratio of the on and off times of the current through the LEDs.

SUMMARY OF THE INVENTION

The object of the present invention is to provide a drive circuit for at least one light-emitting diode with which the brightness of the light-emitting diodes can be regulated in a low-loss way and independently of possible voltage fluctuations in the voltage supply.

This object is achieved by a drive circuit which has a switched-mode regulator, a means for determining current through a light-emitting diode connected to the drive circuit, a regulating device and a controller. The switched mode regulator is constructed so that it can be supplied with a direct input voltage to drive a light-emitting diode. The means for determining current through the light-emitting diode is also constructed to determine the voltage across the diode. The regulating device is configured so as to be fed with a current setpoint value and a voltage setpoint value and with signals representative of the determined current and the determined voltage at the light-emitting diode. The regulating device is also constructed to regulate the current and the voltage supplied to the light-emitting diode according to the respective setpoint values; and the controller is arranged for adjusting the setpoint values.

In the drive circuit according to the invention, the current and/or the voltage of the LED(s) is regulated to an adjustable setpoint value, the setpoint value being adjustable by means of a controller. The LEDs are consequently dimmed directly through the dimming of the current and/or the voltage.

Preferably, the switched-mode regulator can be integrated into an AC/DC converter that supplies the circuit with the necessary direct voltage. That is to say, the AC/DC converter may be designed in such a way that it regulates directly to the desired current value or voltage value.

In a preferred embodiment of the invention, the controller alters the switching behavior of the switched-mode regulator driving the light-emitting diodes by adjusting the setpoint value in such a way that the switching frequency or the duty cycle of the switched-mode regulator is altered. Preferably, the current or the voltage is determined by means of a measuring shunt connected in series or parallel with the light-emitting diode to regulate the current or the voltage, respectively, and/or determines the brightness of the light-emitting diodes by means of a photodiode disposed in the immediate neighborhood of the light-emitting diodes.

In another preferred embodiment of the present invention, the controller alters the resistance value of a variable resistor connected in series with the light-emitting diode to adjust the setpoint value of the current through the light-emitting diodes. In this embodiment, the current through the light-emitting diodes is determined by means of the voltage dropped across the variable resistor and/or the brightness of the light-emitting diodes is determined by means of a photodiode disposed in the immediate neighborhood of the light-emitting diodes.

Further preferred embodiments and developments of the invention are described and claimed herein.

Another development of the invention relates to measures which enable the dimensions of the drive circuit to be kept as compact as possible. In order to achieve this, the drive circuit comprises, at least partly, a multilayer circuit into which passive components, for example resistors, conductor tracks and the like, are integrated. This integration is possible, in particular, if the switched-mode regulator is operated at high frequencies since correspondingly lower capacitance values or inductance values can then be used in the circuit. In the present case, a frequency range of 200 kHz to 1 MHz has proved to be particularly suitable. An increased radiation of electromagnetic high-frequency fields initially due to the increase in frequency can be avoided by suitable screening measures that can easily be undertaken (because of the reduced dimensions of the circuit).

Components can be integrated, for example, by means of multilayer printed circuit board technology. Preferably, the multilayer circuit is implemented by an LTCC (low temperature co-fired ceramic) structure that comprises a plurality of low-sintering ceramic layers or sheets that are disposed above one another and between which conductor tracks are situated. Compared with conventional printed circuit board technology, said LTCC technology, which has been newly developed in recent years and is disclosed, for example, in EP 0 581 206 A2, can achieve a further miniaturization of the circuit. In this technology, inductances and capacitances, in particular, can also be integrated into the multilayer circuit in addition to the conductor tracks. Furthermore, the ceramic material offers the advantage that it conducts heat relatively well, which means that, for the same overall volume, greater powers can be achieved since heat loss is radiated better. Preferably, the heat dissipation is increased yet again by encapsulating the ceramic structure in a metallic housing. An effective screening of the high-frequency fields radiated into the environment by the drive circuit can also be achieved in this way.

At the abovementioned frequencies, many of the components of the drive circuit can be integrated into the multilayer circuit. The remaining passive components and semiconductor chips have, however, still to be mounted on the surface or outside the ceramic structure. In order to achieve as low a space requirement as possible for this purpose, the semiconductor chips are preferably mounted by means of the known flip-chip (FC) technology on the ceramic substrate. In this case, there is inserted between the semiconductor mounted without housing and the contacts on the surface of the carrier substrate a plastic layer that is, on the one hand, conductive perpendicularly to the connection level and is insulating in the connection level and that, on the other hand, absorbs the stresses occurring in the case of different thermal expansion of the semiconductor chip and of the ceramic substrate and, consequently, prevents destruction of the semiconductor chip.

BRIEF DESCRIPTION OF THE DRAWINGS

The invention is explained in greater detail below using various preferred exemplary embodiments with reference to the accompanying drawings.

FIGS. 10a–15 are plan and cross-sectional views illustrating steps in the manufacture a multilayer ceramic (LTCC) structure according to the invention.

DETAILED DESCRIPTION OF THE PREFERRED EMBODIMENTS

Figure 1:
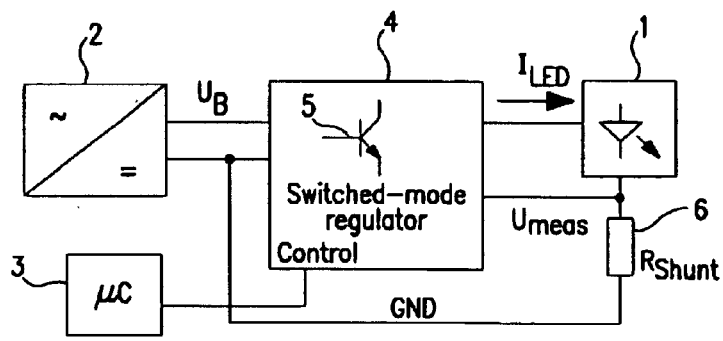
FIG. 1 is a block and circuit diagram of a circuit which constitutes a first exemplary embodiment of a drive circuit according to the invention.
Figure 2:
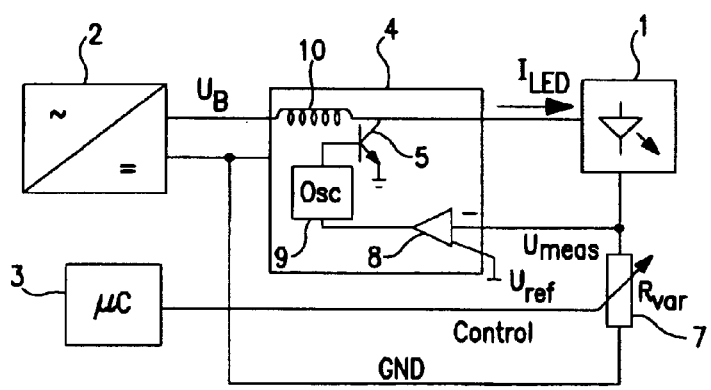
FIGS. 2 to 7 are views similar to FIG. 1 but showing circuits which constitute the diagrammatic circuit design of further exemplary embodiments of a drive circuit according to the invention.

FIGS. 1 and 2 first show two basic exemplary embodiments of a drive circuit according to the invention, whereas FIGS. 3 to 7 and 9 describe modifications and developments. In the figures, identical or similar components are characterized by the same reference symbols.

The drive circuit shown in FIG. 1 essentially comprises a direct-voltage source or an AC/DC converter 2, a switched-mode regulator 4, a light-emitting diode or light-emitting diode arrangement comprising a plurality of light-emitting diodes 1 and a microcontroller 3. The output voltage of the AC/DC converter 2 is fed to the switched-mode regulator 4 as input voltage $U_B$. The switched-mode regulator 4 regulates, in accordance with a control signal fed to it by the microcontroller 3, the current $I_{LED}$) at its output, which is fed to the light-emitting diodes 1.

In the case of the first exemplary embodiment shown in FIG. 1, a measuring shunt 6 in the form of an ohmic resistor is connected in series with the lightemitting diodes 1. To regulate the current through the light-emitting diodes 1, the voltage drop across the measuring shunt 6 is determined and fed to the switched-mode regulator 4 as measured signal $U_{meas}$. In the switched-mode regulator, the current through the light-emitting diodes determined from said measured signal $U_{meas}$ is compared with the setpoint value of the current through the light-emitting diodes supplied by the microcontroller 3 and the current $I_{LED}$ is regulated accordingly.

The switched-mode regulator 4 may be designed, for example, as a step-down converter, as an insulating reverse converter or as a step-up converter, the microcontroller 3 driving a suitable semiconductor switching element 5 of the step-down converter or step-up converter 4. An example of the design of the switched-mode regulator 4 as step-up converter is shown, for example, in FIG. 2 of the second exemplary embodiment of the drive circuit. The controller 3 regulates the switching behavior of the switched-mode regulator 4 in such a way that the switching frequency or the duty cycle of the switched-mode regulator 4 is altered in that the microcontroller 3 drives the semiconductor switching element 5 of the switched-mode regulator 4 in an appropriate way, in particular by means of pulse-width modulation, clocking, control signal to slave, utilization of interruption on fault, amplitude-modulated signals and interruption of the supply voltage and the like.

The drive circuit according to the invention of the first exemplary embodiment shown in FIG. 1 is notable for a low-loss LED drive that is independent of the output voltage of the direct-voltage source or of the AC/DC converter 2, i.e. voltage fluctuations in the voltage source 2 have no influence on the brightness of the light-emitting diodes 1, with the result that the requirements imposed on the direct-voltage source or the converter 2, respectively, are lower than in the case of conventional drive circuits.

The drive circuit shown in FIG. 1 and the further exemplary embodiments are designed in such a way that the output voltage of the switched-mode regulator is matched to the number of the LEDs connected in series. In this connection, the light-emitting diode arrangement may comprise a parallel connection of LEDs connected in series or a series connection of LED parallel connections. A combination of these two possibilities can also be implemented.

In contrast to the first exemplary embodiment of FIG. 1, the second exemplary embodiment shown in FIG. 2 of the drive circuit according to the invention does not comprise an ohmic measuring shunt 6. Instead of the measuring shunt 6, a variable resistor 7, preferably in the form of a field-effect transistor, is connected in series with the light-emitting diodes 1. Said variable resistor 7 is controlled by the controller 3 in order to regulate the current through the light-emitting diodes 1 and, consequently, to make possible various dimming steps.

The microcontroller 3 sets the resistance value of the variable resistor 7 and, consequently, the setpoint value for the current through the light-emitting diodes 1. The measured voltage drop across the variable resistor 7 is a measure of the current flowing through the light-emitting diodes 1 and the variable resistor 7 and is fed to the switched-mode regulator 4. In the switched-mode regulator 4, the measured voltage drop is compared with a preset setpoint value $U_{ref}$ for the voltage drop, whereupon the switched-mode regulator regulates the current $I_{LED}$ through the LEDs in such a way that the measured voltage drop approaches or equates to the preset voltage value $U_{ref}$. Depending on the set resistance value of the variable resistor 7, another current $I_{LED}$ is necessary to achieve the preset voltage drop $U_{ref}$ across the variable resistor 7, with the result that the microcontroller 3 adjusts the setpoint value for the current through the light-emitting diodes by controlling the resistance value of the variable resistor 7.

In the second exemplary embodiment shown in FIG. 2, the switched-mode regulator 4 is designed as a step-up converter. In particular, the step-up converter 4 comprises a coil 10 and a semiconductor switching element 5 that are disposed in standard way as shown in FIG. 2. Furthermore, the measured signal $U_{meas}$ of the voltage dropped across the variable resistor 7 is fed to the inverting input of an operational amplifier 8. The noninverting input of the operational amplifier 8 is at the constant reference potential $U_{ref}$. The output signal of the operational amplifier 8 is fed to an oscillator circuit 9 that controls the semiconductor switching element 5. The oscillator circuit 9 makes possible a high-frequency drive of the semiconductor switching element 5, the switching frequency depending on the measured signal $U_{meas}$ and, consequently, on the actual current through the light-emitting diodes 1. The level of the current $I_{LED}$ fed to the light-emitting diodes 1 by the switched-mode regulator 4 depends on the switching-time parameter of the semiconductor switching element 5.

Figure 3:
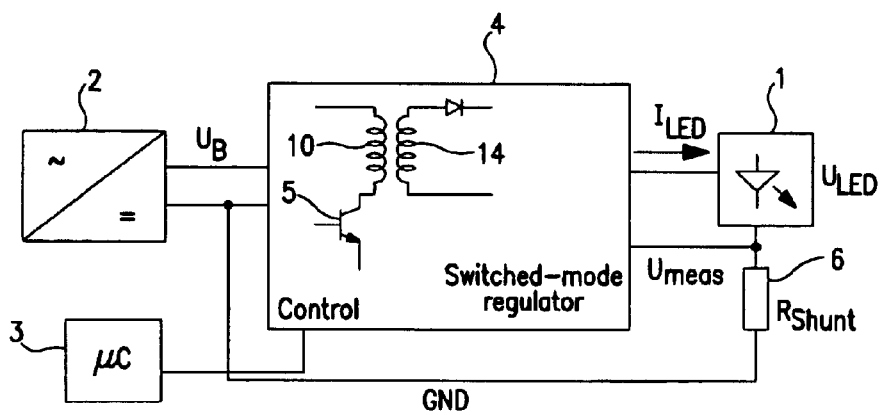

FIG. 3 shows a modification of the drive circuit shown in FIG. 1 in which the coil 10 or the boost choke of the switched-mode regulator 4 is inductively coupled to a further coil 14 that is connected to the output of the switched-mode regulator 4. The advantage of a potential separation formed in this way is that the switched-mode regulator 4 has a variable transformation ratio between its input voltage and its output voltage. In this way, an LED voltage $U_{LED}$ can be obtained that is independent of the supply voltage $U_B$. This means that, in this circuit variant, the LED voltage $U_{LED}$ may be either greater or less than the supply voltage $U_B$.

Figure 4:
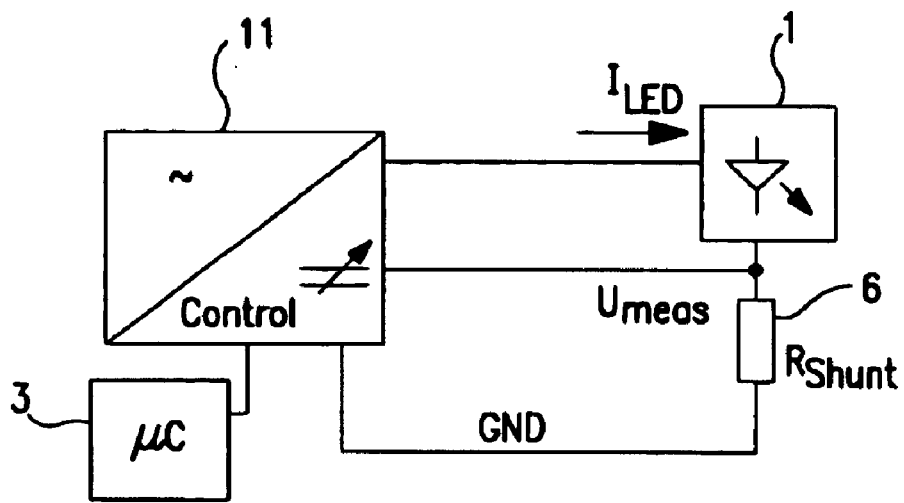

In the fourth exemplary embodiment of the drive circuit shown in FIG. 4, the AC/DC converter 11 is designed so that it directly regulates the desired current $I_{LED}$ through the light-emitting diodes 1. This means that the switched-mode regulator 4 is integrated into the AC/DC converter 2.

To adjust the setpoint value of the current through the light-emitting diodes, both the control options described by reference to FIGS. 1 and 2 can also be used in this embodiment. In FIG. 4, the setpoint value of the current is set as in the case of the first exemplary embodiment of FIG. 1, i.e. an ohmic measuring shunt 6 is connected in series with the light-emitting diodes 1 and the microcontroller 3 regulates the switching behavior of the switched-mode regulator 4. Equally, however, a variable resistor 7 whose resistance value is set via the microcontroller 3, as is the case in the second exemplary embodiment of FIG. 2, may also be provided in series with the light-emitting diodes 1.

Figure 5:
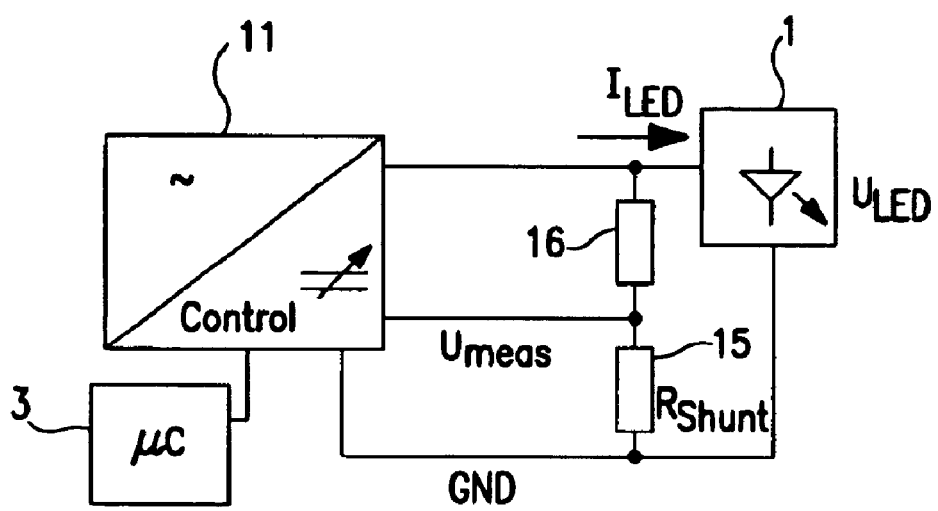

In the exemplary embodiment shown in FIG. 5, the switched-mode regulator 4 is integrated into the AC/DC converter 2 as in FIG. 4. However, in this circuit variant, the regulation does not take place to the LED current $I_{LED}$, but to the LED voltage $U_{LED}$. For this purpose, a voltage divider comprising two resistors 15, 16 are connected in parallel with the light-emitting diode 1. The voltage dropped across the resistor 15 and representing the LED voltage $U_{LED}$ is fed to the AC/DC converter 11 as input signal $U_{meas}$ Within the AC/DC converter 11, the input signal $U_{meas}$ is again compared with the control signal set by the microcontroller 3.

Figure 6:
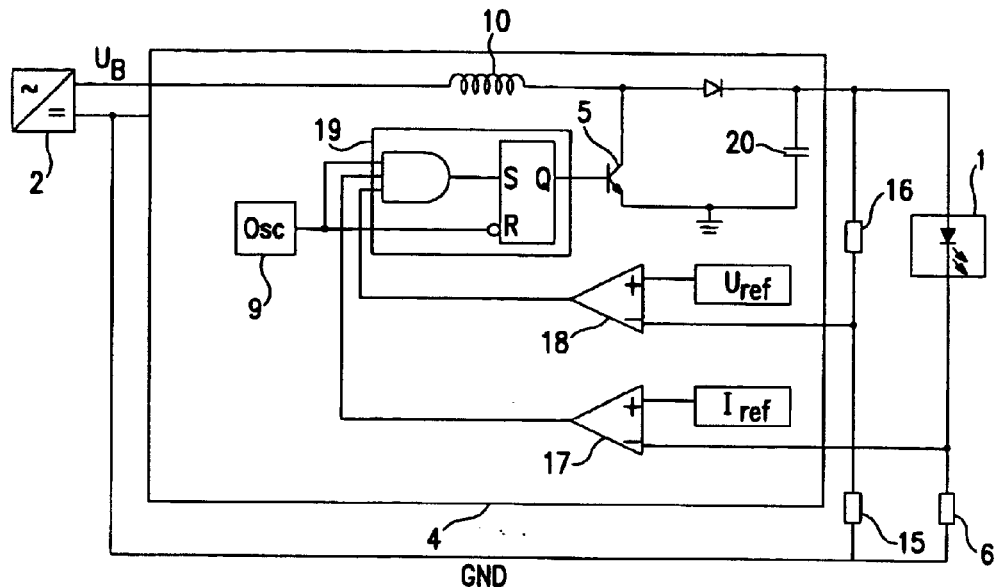

The current-regulation and voltage-regulation options shown in the preceding figures are combined in the example shown in FIG. 6. This circuit is based on the exemplary embodiment shown in FIG. 2, i.e. the switched-mode regulator 4 is formed by a step-up converter, which is now, however, controlled by a combined current regulation and voltage regulation. In this case, a reference current $I_{ref}$ and a reference voltage $U_{ref}$ are set internally and are formed on the basis of a control signal transmitted by the microcontroller (not shown here). Furthermore, the input signals supplied are the voltage dropped across the resistor 6, that corresponds to the LED current, and the voltage dropped across the resistor 15 of the voltage divider, which corresponds to the LED voltage, which are then compared with the corresponding reference values $U_{ref}$ and $I_{ref}$ by operational amplifiers 17 and 18, respectively.

The regulator operates in such a way that it reduces or increases the input via the switched-mode regulator by means of the measured values depending on whether the reference values $U_{ref}$ and $I_{ref}$, respectively, are exceeded or fallen below, one operational amplifier 17 or 18 functioning in each case as regulator. Depending on the deviation of an actual value from the setpoint value, a regulating signal emitted by the operational amplifier 17, 18 is combined via a circuit 19 with the ramp signal of an oscillator 9, thereby ensuring clocking of the switch 5. Finally, a capacitor 20 disposed at the output of the switched-mode regulator effects a smoothing of the current flowing through the LED 1.

Figure 8A:
FIGS. 8a and 8b show the plot, against time, of control signals and an LED current in the exemplary embodiments of FIGS. 6 and 7.

The combination of the oscillator signal with the regulating signals of the two operational amplifiers 17, 18 results in a high-frequency, pulsed clock signal for the switch 5, which is represented by the lower signal curve I in FIG. 8a. Both the frequency and the duration of the on or off pulse of this signal can be varied. The upper signal curve II shows the LED current resulting therefrom. As is to be inferred from this diagram, the LED current decreases in a certain time after the boost clock pulse is switched off at the time instant $t_j$. This traversal of the amplitude may, however, result in a change in color of the light emitted by the LED 1.

Figure 7:
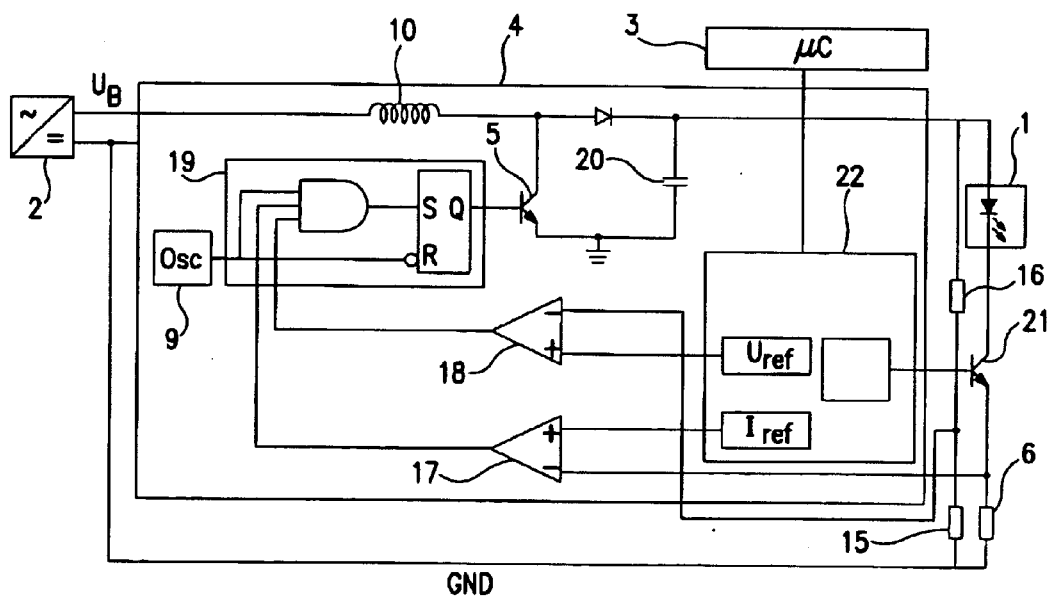
Figure 8B:
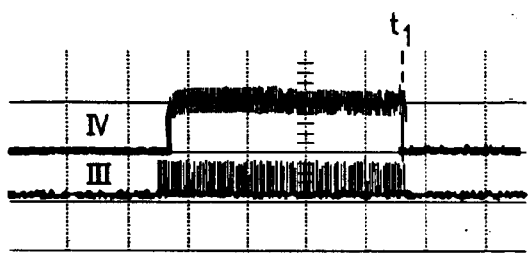

In order to achieve a true-color LED operation, the circuit variant shown in FIG. 7 was therefore supplemented by a further semiconductor switching element 21. The latter is driven by means of a control unit 22 disposed within the switched-mode regulator 4 at a markedly lower clock frequency than switch 5 and has the effect that, when the boost clock pulse is shut off, the current flow through the LED path is interrupted, with the result that no decaying current patterns occur. The corresponding curves of the clock signal III for the switch 5 and the LED current (curve IV) are shown in FIG. 8b. As can be inferred from said curves, a direct switching of the LED current to zero is achieved by these additional methods, with the result that no color variations occur. The internal control unit 22 also serves, furthermore, to convert the control signals transmitted by the external microcontroller 4 into the two reference values $I_{ref}$ and $U_{ref}$.

Figure 9:
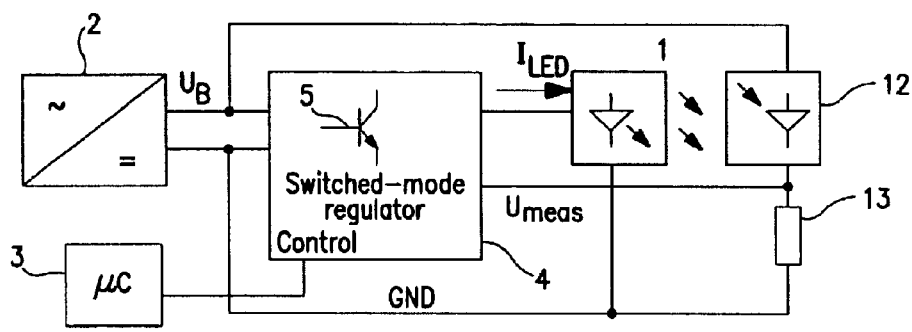
FIG. 9 is a block and circuit diagram of a circuit which constitutes another exemplary embodiment of a drive circuit according to the invention.

Finally, FIG. 9 shows a further exemplary embodiment of the drive circuit according to the invention that ensures an improved efficiency compared with the exemplary embodiment containing the ohmic measuring shunt 6 or the variable resistor 7 in accordance with FIGS. 1 and 2. Instead of the measuring shunt 6 or variable resistor 7 connected in series with the light-emitting diodes 1 for determining the current through the light-emitting diodes 1, at least one photodiode 12 is disposed in the vicinity of the light-emitting diodes 1. Said photodiode 12 determines the brightness of the light-emitting diodes 1. Connected in series with the photodiode 12 is an ohmic measuring shunt 13, the voltage dropped across the measuring shunt 13 being fed to the switched-mode regulator 4 as measured signal $U_{meas}$. The photodiodes 12 are preferably connected to the same voltage supply 2 in the form of the direct-voltage source or of the AC/DC converter.

The switched-mode regulator 5 may also be designed in this exemplary embodiment either as a step-up converter or as a step-down converter. Since, in this embodiment, no resistor that reduces the efficiency of the circuit as a result of a corresponding power drop is connected in series with the light-emitting diodes 1, the efficiency of the drive circuit can be improved further in the case of said exemplary embodiment of FIG. 9 compared with the exemplary embodiments of FIGS. 1 and 2. Depending on the efficiency of the light-emitting diodes 1 used themselves, this improvement in the efficiency manifests itself more or less markedly.

Furthermore, it is equally possible to combine the exemplary embodiment of FIG. 9 with one of the drive circuits shown in FIGS. 1 to 7. That is to say the determination of the brightness of the light-emitting diodes by means of one or more photodiodes 12 may also additionally be provided to determine the current through the light-emitting diodes 1 or the voltage. This increases the precision and reliability of the regulation by means of the drive circuit since at least two measured values are used to regulate the current or the voltage.

In conclusion, the structural design of the drive circuits according to the invention, which is suitable, in particular, if switching-time parameters with frequencies in the range from 200 kHz to 1 MHz are used, will now be dealt with. The LTCC multilayer circuit already mentioned is suitable for the integration of the passive components. The production of such a ceramic multilayer structure will now be explained by reference to FIGS. 10a–15.

The basic element of an LTCC structure is formed by an approximately 100–130 µm-thick low-sintering ceramic sheet, for example, composed of aluminum oxide that is blended with glass particles and further filler material, as is shown in plan view in FIG. 10a. The first processing step is to punch via holes 31 in the ceramic sheet 30. FIG. 10b shows the appropriate processed ceramic sheet 30 along the section I—I in FIG. 10a. Before the firing process, the diameter of the via holes 31 is about 250 µm. In the next operational step shown in FIGS. 11a and 11b, the via holes 31 are then filled with a conductive material, normally with a conductor paste that has a relatively high solids content.

Conductor tracks 32 are then printed on the upper side of the ceramic sheet 30 in accordance with the desired circuit structure (FIG. 12). This is normally done by the screen-printing process. In this process, silver pastes, silver/palladium pastes, gold pastes or copper pastes are used for the via holes and for the conductor tracks. In order to avoid bowing, the material composition of the conductor pastes is chosen in such a way that they shrink to the same extent as the ceramic layers 30 themselves in the subsequent sintering.

The processing steps just described are first performed separately for each ceramic sheet 30. The individual layers of punched and printed ceramic sheets 30 are then arranged above one another and aligned, as is shown in FIG. 13. They are then stacked in a pressing mold and laminated with heat and pressure being supplied, with the result that a cohesive ceramic structure forms. The latter is finally sintered to form a high-strength ceramic structure, a homogeneous ceramic substrate 33 being formed, as shown in FIG. 14, that has a continuous conductor track network 34 integrated into it.

In the concluding processing step shown in FIG. 15, the components that cannot be integrated into the ceramic circuit, for example diverse semiconductor chips 35 are mounted on the upper side of the ceramic substrate 33 and connected. In this connection, conductor tracks 36 may also be applied retrospectively to the upper side. Finally, the entire complex is provided with connections and surrounded by a metallic housing that increases the heat dissipation on the one hand and screens the high-frequency electromagnetic fields produced during operation on the other.

Figure 16:
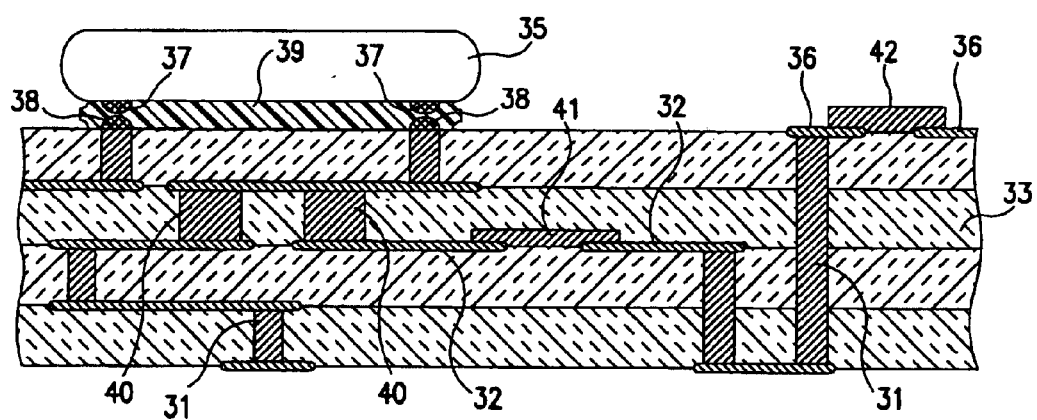
FIG. 16 is an enlarged cross-sectional view showing a portion of an LTCC structure according to the invention.

FIG. 16 shows yet again a region of the LTCC structure in section in an enlarged view. In this figure, the separating lines between the individual original ceramic layers are still shown, even if, as described above, a homogeneous ceramic structure 33 is formed after the lamination and sintering. As is to be seen on the right-hand side of the diagram, the vertically extending conductor tracks 31, that are formed by the via holes punched out in the first process step, also extend over several levels in this case. The essential advantage of the use of an LTCC structure is that not only the conductor tracks 31 and 32, respectively, but also other passive components can be integrated into the multilayer circuit. Within the framework of the processing step shown in FIG. 7, other materials having a certain conductivity may also be applied, for example, to the upper side of the individual ceramic layer 30 in addition to the conductor paste for the general conductor tracks 32, with the result that a resistor 41 can be completely integrated into the ceramic structure 33 in this way. In addition to the usual via holes 31, however, even larger, vertically extending holes, for example, may also be punched in a ceramic layer 30. These can then be filled with a material 40 having a certain permittivity, with the result that integrated capacitances can be implemented in the ceramic substrate 33 by the conductor track/dielectric 40/conductor track layer arrangement shown in FIG. 16.

Furthermore, an inductance can be implemented within the ceramic structure 33 by a spiral conductor track printed on an individual ceramic layer 30. It would also be conceivable, however, to distribute the various windings of the inductance over a plurality of conductor track levels. Such structures are also described as planar inductances. To increase the inductance, an opening or cutout that is filled with a suitable core material, for example ferrite, could furthermore also be provided in the ceramic substrate 33.

Only inductance values and capacitance values up to a certain level can be achieved for the components integrated into the multilayer circuit. Said values are, however, adequate for the correct operation of the circuit arrangement according to the invention at frequencies in the range between 200 kHz and 1 MHz.

However, in the case of the LTCC technology, not all the components of the circuit arrangement can be integrated into the multilayer circuit 33. For example, the operational amplifier is formed by a semiconductor chip 35 that cannot be integrated into the ceramic layer 33. Preferably, contact then is made to such semiconductor chips 35 on the upper side of the multilayer circuit 33 by means of flip-chip technology. In this process, an anisotropic, electrically conducting plastic that is electrically conductive perpendicularly to the flip-chip connection level and is insulating in the connection level is introduced between the upper side of the ceramic substrate 33 and the unencapsulated semiconductor circuit 35. As electrically conducting particles, the plastic contains, for example, irregularly shaped metal pieces or, alternatively, also fairly small beads or fibers that effect a connection between the surface contacts 38 of the ceramic substrate 33 and the connecting pads 37 of the semiconductor chip 35. Furthermore, said plastic 38 also absorbs stresses that may result from a different thermal expansion of the ceramic material and the semiconductor chip 35. Said flip-chip technology makes possible a very high connection density, with the result that it likewise contributes to a volume reduction of the entire circuit. The light-emitting diodes themselves can also be applied to the upper side of the multilayer circuit 35 using this technology. It goes without saying that resistors 42 or inductances of the circuit may also be disposed as discrete parts on the surface.

What is claimed is:

1. A drive circuit for at least one light-emitting diode, said circuit comprising:
a switched-mode regulator that can be supplied with a direct input voltage to drive said at least one light-emitting diode;
means for determining current through a light-emitting diode connected to said drive circuit and for determining the voltage across such light-emitting diode;
a regulating device to which a current setpoint value and a voltage setpoint value are fed and to which signals representative of the determined current and the determined voltage at the light-emitting diode are supplied, said regulating device being constructed to regulate the current and the voltage supplied to the light-emitting diode according to the respective setpoint values; and
a controller arranged for adjusting the setpoint values.

2. A drive circuit according to claim 1, and further including:
means for determining the brightness of said light-emitting diode and for adjusting said regulating device according to the determined brightness.

3. A drive circuit according to claim 1 or 2, and further including:
an AC/DC converter arranged to provide said direct voltage, said switched-mode regulator being integrated into said AC/DC converter.

4. A drive circuit according to claim 1 or 2, wherein:
said switched-mode regulator comprises a semiconductor switching element arranged to be driven by said controller.

5. A drive circuit according to claim 4, wherein:
said controller is connected to drive the said semiconductor switching element by one of amplitude modulation, pulse-width modulation and variable frequency modulation.

6. A drive circuit according to claim 4, wherein:
said controller is constructed and arranged to adjust said setpoint values in such a way that at least one of the switching frequency and said duty cycle of the switched-mode regulator is altered.

7. A drive circuit according to claim 1, and further including:
a measuring shunt arranged to be connected in series with a light-emitting diode, said measuring shunt being operative to determine current through said light-emitting diode.

8. A drive circuit according to claim 1, and further including:
a measuring shunt arranged to be connected in parallel with a light-emitting diode, said measuring shunt being operative to determine the voltage across said light-emitting diode.

9. A drive circuit according to claim 1, wherein:
said controller includes a variable resistor arranged to be connected in series with said light-emitting diode, said variable resistor being adjustable to adjust the setpoint value.

10. A drive circuit according to claim 9, wherein:
said variable resistor is a field-effect transistor.

11. A drive circuit according to claim 9 or 10, wherein:
said variable resistor is connected such that current through the light-emitting diode can be determined by means of the voltage drop across the variable resistor.

12. A drive circuit according to claim 1, and further including:
a photodiode connected and arranged to determine the brightness of said light emitting diode.

13. A drive circuit according to claim 1, wherein:
said switched-mode regulator is a step-up converter, a step-down converter or an insulating reverse converter.

14. A drive circuit according to claim 1, wherein:
said switched-mode regulator comprises a boost choke that is inductively coupled to a further coil, which in turn is connected to the output of the switched-mode regulator.

15. A drive circuit according to claim 1, wherein:
said switched-mode regulator includes a smoothing capacitor at its output.

16. A drive circuit according to claim 1, and including:
a further controllable switching element in the current path of the LED.

17. A drive circuit according to claim 1, wherein:
said switched-mode regulator is operable at frequencies in the range between 200 kHz and 1 MHz.

18. A drive circuit according to claim 1, wherein:
said circuit comprises at least one multilayer circuit into which passive components of said drive circuit are integrated.

19. A drive circuit according to claim 18, wherein:
said multilayer circuit comprises a plurality of conductor boards disposed above one another, to whose upper sides and/or lower sides conductor tracks composed of a conductive material are applied, said conductor boards having holes filled with a conductive material for connecting various conducting levels.

20. A drive circuit according to claim 19, wherein:
said multilayer circuit is an LTCC structure that comprises a plurality of low-sintering ceramic layers, said layers being disposed above one another and having therebetween, conductor tracks, said ceramic layers also having holes through which conductor tracks of different levels are connected.

21. A drive circuit according to claim 18, wherein:
said multilayer circuit is surrounded by a metallic housing.

22. A drive circuit according to claim 18, wherein:
semiconductor chips are mounted on a surface of said multilayer circuit flip-chip technology.

* * * * *